Jan. 7, 1941.  J. C. HEINTZ  2,228,212
ART OF RETREADING TIRES
Filed Dec. 27, 1939
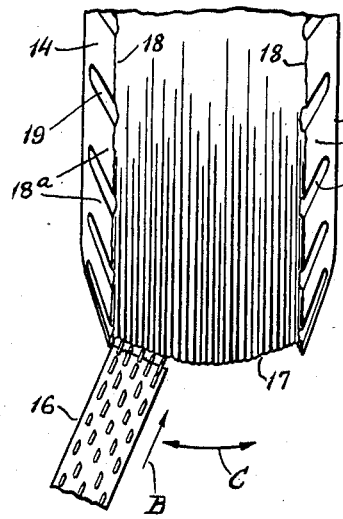
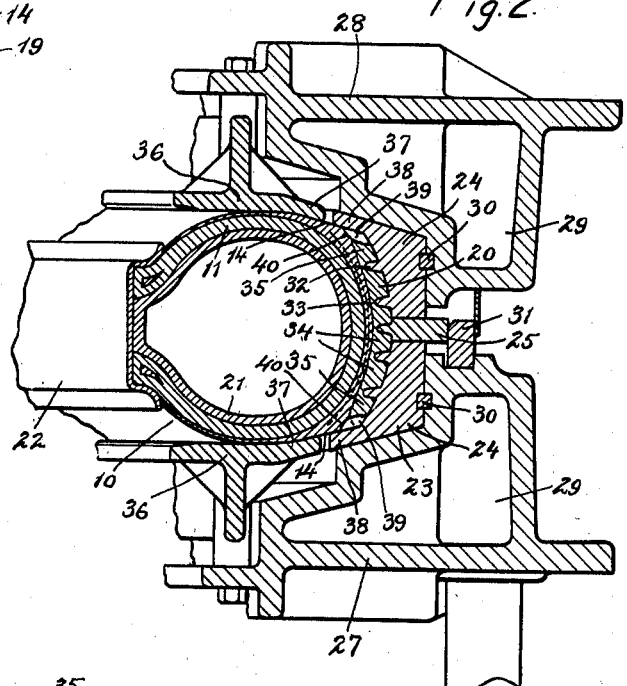
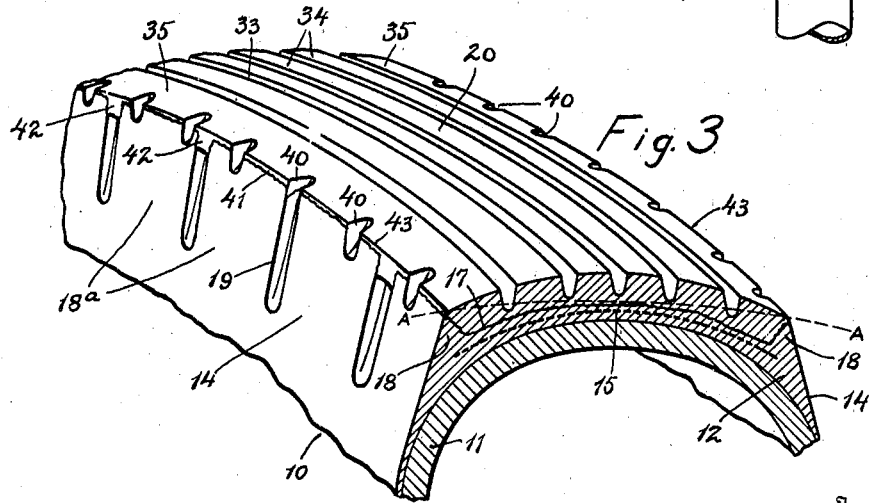
Inventor,
J. C. Heintz,
By Robert M. Pierson,
Attorney Patented Jan. 7, 1941

2,228,212

UNITED STATES PATENT OFFICE 2,228,212

ART OF RETREADING TIRES

James C. Heintz, Lakewood, Ohio

Application December 27, 1939, Serial No. 311,151

4 Claims. (Cl. 154—14)

This invention relates to the art of retreading pneumatic tires, and especially to recapping over the carcass and portions of the old tread rubber without complete removal of the latter. Its principal objects are to provide a rebuilt rubber tread of the full original width, with sharp shoulder corners, utilizing portions of the old vulcanized rubber shoulder flanks, effecting a better joint, with a corresponding saving in the amount of new rubber, improving the appearance and ventilation of the retread and obtaining highly flexible tread shoulders and other advantages as will hereinafter appear.

The prevailing recap practice heretofore has been to make the rebuilt tread narrower than the original, resulting in a higher rate of retread wear. Another practice which involves the use of more new rubber has been to provide a full-width recap, with seam edges in the shoulder side or flank surfaces. I have previously employed a third practice of recapping with marginal seams in the tread wearing surface, utilizing the old tread margins as supporting surfaces, this method being economical of new rubber but producing rounded tread edges caused by bulging of the tire margins during retreading, followed by marginal recession on deflation and removal from the mold, and involving rather a high rate of wear in certain cases. My present invention overcomes the principal objections to these prior methods.

Of the accompanying drawing views,

Fig. 1 is a partial edge view illustrating the step of channeling the old tread in the performance of my invention.

Fig. 2 is a transverse section of a recapping mold and tire therein for practicing this invention.

Fig. 3 is a perspective view of an outer fragment of the recapped tire.

In the drawing, 10 is a pneumatic tire casing having the usual carcass 11 of rubberized cord fabric plies, an original rubber tread 12 vulcanized thereon and limited to a width less than that of the tire by the usual radially outward converging shoulder flank surfaces 14, and a fabric breaker strip 15 embedded in cushion rubber underlying the tread proper. In Fig. 3, the line A—A represents approximately the worn tread contour for a tire of the heavy-duty or high-pressure type. In that type, and especially where the vehicle service involves frequent stops and starts, it is considered important to have the maximum width of tread active at all times, to prolong the tread life, and that is also true in some other services.

Fig. 1 illustrates a preferred mode of preparing the worn tread. The tire casing 10, mounted with an inflated air bag upon a suitable rim, is turned slowly against a rapidly rotated toothed rasp wheel 16 which is mounted to receive a radial in-feed shown by the arrow B and a reciprocating arcuate lateral traverse shown by the double-ended arrow C. The operator so regulates these feeding actions that the vulcanized tread rubber is channeled with a shallow grooved bed 17, substantially out to the shoulder corners, leaving a marginal pair of old-rubber flaps 18 tapering outwardly to thin edges. Where the tread margins are laterally recessed at frequent intervals as shown at 19, to provide increased ventilation and flexibility as is often done, especially with heavy-duty tires for trucks, etc., the shoulder flanks and the flaps 18, of course, are interrupted or divided into a circumferential series of short segments 18ª. The channeling is sometimes carried through to the fabric breaker or the carcass fabric.

On removal of the tire from the channeling machine, the bottom and sides of the channel bed 17 are coated with rubber cement which is then dried to a tacky condition and vulcanizable retread rubber is laid in a full circle in the channel to the desired thickness, and rolled down onto the cemented surface. 20 indicates the molded new tread rubber in the channel. The raw-treaded tire is first lightly inflated and measured, the proper size mold matrix selected with the aid of a suitable chart, and the tire provided with a curing bag 21 and mounted on a suitable curing rim 22 before placing in the mold, if not already so bagged and rim-mounted for the channeling operation.

23 is the recapping mold, composed of a pair of main segmental matrix rings 24, together with a spacer ring 25 of selected width between them, when required to fit the particular tire. The rings 24 are conical sided to fit complemental seats on respective lower and upper heater members or sections 27, 28 of a horizontal hinged vulcanizer, cast with steam jackets 29, although the invention might be practiced with a suitable matrix in a different type of heater. The main matrix rings are detachably mounted on the respective heater sections with suitable fastenings including keys 30, and the spacer ring is encircled in the lower section 27 by the usual endless retainer ring 31.

Inwardly projecting mold ribs 32 on the matrix rings form tread grooves 33 between a series of intermediate longitudinal tread ribs 34 and marginal tread ribs 35 with a collective transversely convex ground-engaging contour of a sufficiently flat shape to normally provide an active supporting surface for the full tread width, whose radial depth at the shoulders is at least as great as the middle depth and preferably slightly greater.

Relatively cold side pressure rings 36, having marginal portions 37 with arcuate and slightly conical inner surfaces overhanging and conforming to the tire side shape and adapted to slightly compress the tire sides when the mold is closed, are detachably mounted on the respective heater sections 27, 28. The matrix rings 24 are provided with inwardly conical, radially inward extending integral flanges 38 conforming to the conical shoulder flanks 14 for confining the latter and molding the new rubber which extends into the flank faces. Their inner edges are closely adjacent to the outer edges of the pressure ring margins 37 and spaced therefrom a variable distance depending on the relation of matrix to side ring diameters, but not enough to permit objectionable bulging into the intervening gaps. In the corners of the matrix cavity are formed integral lugs 39 for molding a circumferential series of notches or recesses 40 in the tread shoulder corners, for air cooling or ventilation and increased flexibility of the marginal tread ribs 35, said notches generally having a pitch spacing different and more frequent than that of the old tread notches and being formed at least partly in the old vulcanized tread rubber, except where the old and new recesses coincide as shown about at the middle of Fig. 3. The new tread rubber overlies the outer edges of the old rubber flaps 18 at 41, to a greater or less depth depending upon the depth to which the new recap rubber is built up, it plugs or closes the mouths of the old side recesses 19 at 42 in the outer part of their radial depth and it forms or re-forms sharp new shoulder corners 43 at the junction of the tread margins with the shoulder flanks 14.

On placing the raw-treaded tire in the lower mold half, closing the upper half thereon, and clamping the mold parts together in the usual manner, the inflation is increased to full curing pressure, the recap rubber is molded by the hot matrix and integrally vulcanized homogeneously upon the tire casing and to the old tread rubber thereof, for the full original tread width and any excess caused by growth of the casing in service, while the tire sides and shoulder flanks are confined by the relatively cold side pressure rings 36. The recapped product has well ventilated and flexible shoulder flanks and a good ornamental appearance due to the remains of the old side recesses 19 and provision of new recesses 40, its durability is increased because of such full width, the amount of new rubber is decreased as compared with other full-width recaps and rounded shoulder corners are avoided.

I claim:

1. The method of recapping a pneumatic tire having radially outward converging tread shoulder flank faces which comprises channeling the old tread substantially out to the shoulder corners to form a capping bed with thin-edged circumferential abutment flaps of vulcanized rubber along each side thereof, applying vulcanizable new rubber in a full circle between said flaps, and molding and vulcanizing the new rubber in outwardly convex form upon said bed, against the flaps and into said flank faces, with sharp corners over the flap edges.

2. A method according to claim 1 including the step of laterally indenting the shoulder flank on each side with a circumferential series of recesses at least partly in the old rubber.

3. A method according to claim 1 in which the tire is confined at the sides between conical molding and flank-engaging vulcanizing surfaces and, radially inward thereof, between separate, closely adjacent, relatively cold surfaces arcuately and conically confining the tire middle sides and adjacent convergent shoulder flanks.

4. The method of recapping a pneumatic tire having conical rubber shoulder flanks interrupted by circumferentially spaced radial and lateral recesses which comprises channeling the old tread substantially out to the shoulder corners to form a capping bed with thin-edged, circumferential, abutment-flap segments between the recesses, applying vulcanizable new rubber in a full circle between said flap segments and the recesses, molding and vulcanizing the new rubber in a hot matrix over the abutment-flap segment edges while confining it at the recess mouths in the shoulder flanks and confining said flanks between the recesses to form sharp shoulder corners of new rubber, and while laterally indenting the shoulder flank corners at circumferentially spaced intervals, at least partly in the old vulcanized rubber, and separately confining the tire sides between relatively cold surfaces closely adjacent to the matrix edges.

JAMES C. HEINTZ.